(No Model.)

E. H. SPENCER.
JOURNAL BOX.

No. 574,958. Patented Jan. 12, 1897.

WITNESSES
C. Nordfors
C. Gerst

INVENTOR
Erwin H. Spencer
BY
Edgar Tate & Co
ATTORNEYS

UNITED STATES PATENT OFFICE.

ERWIN HARRISON SPENCER, OF WEST BAY CITY, MICHIGAN.

JOURNAL-BOX.

SPECIFICATION forming part of Letters Patent No. 574,958, dated January 12, 1897.

Application filed June 24, 1896. Serial No. 596,740. (No model.)

*To all whom it may concern:*

Be it known that I, ERWIN HARRISON SPENCER, a citizen of the United States, and a resident of West Bay City, in the county of Bay and State of Michigan, have invented certain new and useful Improvements in Journal Boxes or Bearings, of which the following is a specification, reference being had to the accompanying drawings, forming a part thereof, in which similar numerals of reference indicate corresponding parts wherever found throughout the several views.

This invention relates to journal boxes or bearings for the axles of cars and other vehicles and for revoluble shafts, spindles, and similar devices and the object thereof is to provide an improved journal box or bearing which is not liable to heat or overheat, and which may be operated, if desired, without the use of oil or other lubricants.

The invention is fully disclosed in the following specification, of which the accompanying drawings form a part, in which—

Figure 1:
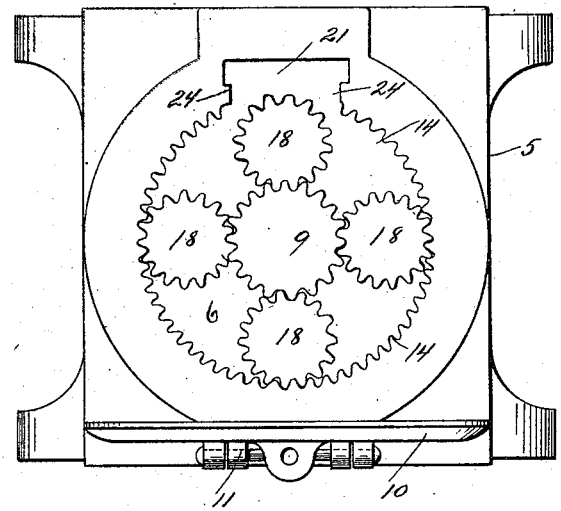
Figure 2:
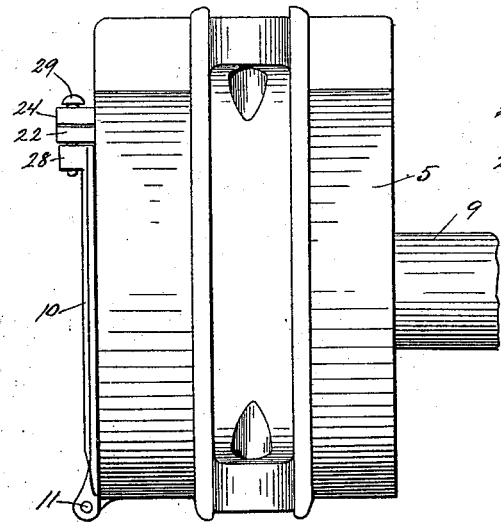

Figure 1 is an end view of my improved journal box or bearing; Fig. 2, a side view thereof, and Fig. 3 a central vertical section.

In the practice of my invention I provide a journal-box or casing 5, which is preferably of the form shown in the drawings, but which may be of any desired shape, and which is provided with a central circular chamber 6, which is open at one end and closed at the other by a plate 7, and said box or casing may be composed of one piece, or it may be divided centrally and horizontally or vertically and the parts thereof be securely bolted together.

The closed end plate 7 is provided with a central circular opening 8, through which the shaft or axle 9 is passed, and the opposite end is provided with a door or cover 10, which is hinged thereto at 11, and which is adapted to close one end of the central circular chamber 6.

The inner walls of the central circular chamber 6 are provided with two annular inwardly-directed flanges or ribs 12, by means of which said inner walls are divided into three equal annular spaces 13, and the central annular space 13 or the walls thereof are smooth, while the walls of the outer annular spaces 13 are each provided with inwardly-directed cogs or gear-teeth 14.

The axle or shaft 9 passes centrally through the circular chamber 6, and is provided with two annular flanges or collars 16, which are in transverse line with the inwardly-directed ribs or flanges 12, formed in the walls of the circular chamber 6, and the central portion of said shaft, between said annular flanges or collars, is smooth, while at each side thereof are formed cogs or gear-teeth 17. I also provide a plurality of rollers 18, any desired number of which may be employed, and four of which are shown in Fig. 1, and these rollers are provided with two annular grooves 19, into which the ribs or flanges 12 in the walls of the central chamber 6 and the collars or flanges 16 on the shaft or axle are adapted to enter, and the central portion of said rollers 18 is smooth and similar in form to the central portion of the shaft or axle 9, while the ends thereof are provided with cogs or gear-teeth 20.

Figure 3:
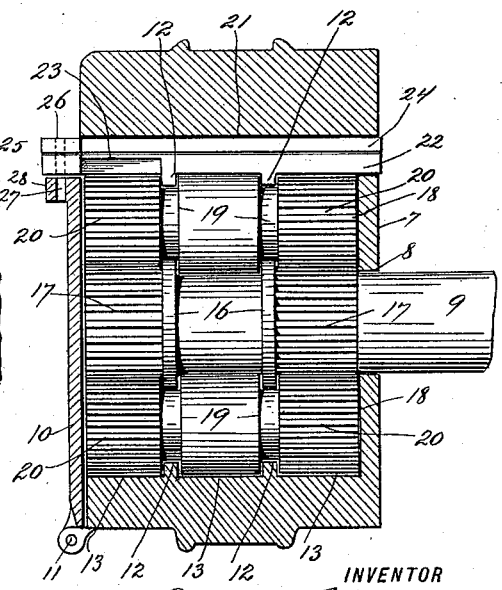

The rollers 18 are placed in the annular space between the shaft or axle 9 and the side walls of the circular chamber 6, as clearly shown in Figs. 1 and 3, and the cogs or gears 20 on the ends thereof engage with the corresponding cogs or gears 17 on the shaft or axle 9, and the central smooth portions thereof engage with the corresponding central smooth portion of the shaft or axle, and the flanges or ribs 12 in the walls of the circular chamber 6 and the flanges or collars 16 on the shaft or axle, operating in connection with the annular grooves 19 in the rollers 18, securely hold said rollers in place and prevent their lateral displacement, and said rollers will always be held in the same relative position in which they are placed regardless of the number thereof employed.

The chief bearing of the shaft or axle is formed by the central smooth portion thereof, which operates in connection with the central smooth portion of the rollers 18, and the cogs or gear-teeth on said rollers and on the shaft or axle operate to revolve and hold said rollers in the same relative position at all times. This bearing is similar in operation to an ordinary ball-bearing and will operate substantially in the same manner, and the use of oil and other lubricants in connection therewith is not necessary.

In order to properly place the rollers in posion, I provide in one side of the journal-box or casing a longitudinal chamber 21, which opens inwardly, and in this chamber I insert, after the rollers have been placed in position, a plate 22, the inner surface of which is formed to correspond with the inner walls of the circular chamber 6, the ends thereof being provided with cogs or gear-teeth and the central portion being smooth in cross-section, and said plate 22 is also provided with inwardly-directed flanges or ribs 12. This plate 22 has formed on its side or sides longitudinally-extending angular ledge or ledges 23, which are adapted to rest on shoulders 24, formed in the sides of the longitudinal chamber 21, as may be seen in Fig. 1. The form of the plate 22 is such as to exactly fill the lower portion of the chamber 21 and complete the inner walls of the circular chamber 6, and over the plate 22 is inserted a plate 24', by which said plate 22 is securely held in position, and by means of this arrangement the inner walls of the circular chamber 6 are practically continuous, the continuity thereof being unbroken after the plate 22 has been placed in position.

The ends of the plate 22 and the plate 24' project at one side of the box or casing, as shown at 25, and formed therein is a central vertical opening or passage 26, which is adapted to register with a similar opening 27, formed in a shoulder or projection 28 on the side of the door 10 opposite the hinge 11 thereof, and through these openings is passed a bolt or pin 29, by which means the door is locked in the closed position.

Any suitable device may be employed, however, for locking the door, and my invention is not limited to the number of the rollers 18 employed nor to the shape of the box or casing 5, and it is evident that many changes in and modifications of the construction herein described may be made without departing from the spirit of my invention or sacrificing its advantages.

It will be seen that the central annular smooth portion of the inner walls of the circular chamber 6 constitutes a track or way which corresponds with the central portion of the rollers 18, and that said central portions of the rollers 18 correspond with that portion of the shaft or axle between the collars or ribs 16, and this constitutes a smooth track or bearing for the shaft or axle.

I prefer to place the rollers 18 in position so that they cannot touch each other, and with this object in view any desired number of said rollers may be employed, and it will also be apparent that these rollers may be of any preferred size in cross-section, and the ledges 23 in the end of the plate 22 also, as will be understood, serve to assist in holding said plate in proper position.

My improved bearing is simple in construction and operation, and is not liable to get out of order or need repair, and, Having fully described my invention, I claim as new and desire to secure by Letters Patent—

1. A journal box or bearing for axles having a casing provided with a circular central chamber therein, an end plate having a central opening therein secured at one end of said casing, an axle adapted to pass therethrough, a door hinged to said casing and covering the outer end thereof, annular inwardly-directed ribs formed on the wall of said chamber and dividing said wall into three equal annular spaces, inwardly-directed cogs in the walls of said outer annular spaces, annular flanges within said casing on said axle and being in line respectively with said ribs, gear-teeth formed on said axle within said casing and on the other sides of said flanges, a plurality of rollers in said casing having two annular grooves therein adapted to receive said ribs and flanges, cogs secured to said rollers outside of said grooves and engaging said cog and gear-teeth, said casing being provided in the upper portion thereof and in communication with said chamber with a longitudinal slot, shoulders in the sides thereof, a plate adapted to snugly fill the lower part of said slot, ribs on said plate registering with the aforesaid ribs, teeth on the under side of said plate outside of said ribs, a shoulder on the outer side of said door, a plate passing through the upper part of said slot and securing the aforesaid plate, said plate and shoulder being provided with a registering vertical slot therein, and a bolt adapted to pass therethrough, all of the said parts being combined substantially as described.

2. In a journal-box for axles, a casing having a circular chamber therein, a plate with an opening therein secured at one end, an axle passing therethrough, annular ribs on the walls of said chamber, cogs secured to said walls outside of said ribs, rollers having grooves therein adapted to receive said ribs, teeth on the said rollers outside of the said grooves, annular flanges on said axle adapted to enter said grooves, cogs also on said axle outside of said flanges, said casing having a longitudinal slot therein, shoulders in the sides thereof, a plate having ledges on the sides thereof adapted to engage said shoulders, cogs on the under side of said plate corresponding to said teeth on the rollers, ribs also secured to the under side of said plate, plate 24', and means for securing said latter plate in place, all of the said parts being combined substantially as described.

In testimony that I claim the foregoing as my invention I have signed my name, in presence of the subscribing witnesses, this 20th day of June, 1896.

ERWIN HARRISON SPENCER.

Witnesses:
CHRIST GATES,
JOHN C. HEATLEY.